(12) United States Patent
Legault et al.

(10) Patent No.: US 11,494,773 B2
(45) Date of Patent: Nov. 8, 2022

(54) SYSTEM AND METHOD FOR INTEGRATING CYBER FRAUD INTELLIGENCE AND PAYMENT RISK DECISIONS

(71) Applicant: JPMorgan Chase Bank, N.A., New York, NY (US)

(72) Inventors: Jean-Francois Legault, Brooklyn, NY (US); Josh Pope, Tampa, FL (US); Wayne A. Willoughby, Lutz, FL (US); D. J. Knoedler, Powell, OH (US); Rahul Saxena, Hillsborough, NJ (US); Anish Pyne, Edison, NJ (US); Rohan M. Amin, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 74 days.

(21) Appl. No.: 15/712,614

(22) Filed: Sep. 22, 2017

(65) Prior Publication Data

US 2019/0095919 A1   Mar. 28, 2019

(51) Int. Cl.
*G06Q 20/40* (2012.01)
*G06F 21/62* (2013.01)
(Continued)

(52) U.S. Cl.
CPC ......... *G06Q 20/4016* (2013.01); *G06F 21/50* (2013.01); *G06F 21/6245* (2013.01);
(Continued)

(58) Field of Classification Search
CPC .. G06Q 20/4016; G06Q 20/40; G06Q 20/382; G06Q 20/401
(Continued)

(56) References Cited

U.S. PATENT DOCUMENTS 7,403,922 B1   7/2008 Lewis et al.
8,020,763 B1 * 9/2011 Kowalchyk .......... G06Q 40/025
                                                   235/380
(Continued)

FOREIGN PATENT DOCUMENTS

JP   2006285844 A  * 10/2006
JP   2016170761 A    9/2016
WO     0237219 A2    5/2002

OTHER PUBLICATIONS

International Search Report and Written Opinion in PCT/US18/52117 dated Dec. 6, 2018.
(Continued)

*Primary Examiner* — Hao Fu
(74) *Attorney, Agent, or Firm* — Greenblum & Bernstein, P.L.C.

(57) ABSTRACT

The invention relates to a method and system that combines payment data and cyber fraud indicators to identify potential fraud in payment requests from a client. The system comprises: a memory that stores and maintains a list of known fraud characteristics and cyber fraud indicators; and a computer processor, coupled to the memory, programmed to: receive, via an electronic input, a payment instruction from the client; identify one or more cyber fraud indicators associated with the payment instruction; apply payment decisioning to merge the one or more cyber fraud indicators to the payment instruction; generate a risk score based on the payment decisioning to determine whether the payment instruction should be executed; and automatically apply the payment decisioning to the payment instruction.

12 Claims, 3 Drawing Sheets

(51) Int. Cl.
   *H04L 9/40* (2022.01)
   *G06F 21/50* (2013.01)
(52) U.S. Cl.
   CPC ... *G06Q 20/40145* (2013.01); *H04L 63/1425* (2013.01); *G06F 2221/2101* (2013.01); *G06F 2221/2111* (2013.01); *H04L 2463/102* (2013.01)
(58) Field of Classification Search
   USPC .......................................................... 705/38
   See application file for complete search history.

(56) References Cited

U.S. PATENT DOCUMENTS

| | | | |
|---|---|---|---|
| 9,031,877 B1* | 5/2015 | Santhana | G06Q 20/4016 705/50 |
| 2003/0174823 A1 | 1/2003 | Justice et al. | |
| 2006/0282660 A1* | 12/2006 | Varghese | G07F 7/1083 713/155 |
| 2007/0106582 A1 | 5/2007 | Baker et al. | |
| 2007/0239604 A1 | 10/2007 | O'Connell et al. | |
| 2011/0196791 A1 | 8/2011 | Dominguez | |
| 2011/0238575 A1 | 9/2011 | Nightengale et al. | |
| 2012/0096553 A1* | 4/2012 | Srivastava | H04L 63/1441 709/206 |
| 2012/0158541 A1 | 6/2012 | Ganti et al. | |
| 2012/0254243 A1* | 10/2012 | Zeppenfeld | H04M 15/47 707/778 |
| 2015/0032624 A1 | 1/2015 | Claridge et al. | |
| 2015/0106265 A1* | 4/2015 | Stubblefield | G06Q 50/265 705/44 |
| 2015/0213246 A1* | 7/2015 | Turgeman | G06F 21/31 726/23 |
| 2015/0339641 A1 | 11/2015 | Krietzman et al. | |
| 2016/0005029 A1* | 1/2016 | Ivey | G06Q 20/409 705/44 |
| 2017/0004501 A1* | 1/2017 | Ledford | G06Q 20/4016 |
| 2017/0251006 A1 | 8/2017 | LaRosa et al. | |
| 2017/0374076 A1* | 12/2017 | Pierson | H04L 63/0236 |
| 2018/0181962 A1* | 6/2018 | Barnhardt | G06Q 20/4016 |
| 2018/0308099 A1* | 10/2018 | Binns | G06Q 20/4016 |

OTHER PUBLICATIONS

European Patent Office, Communication and Extended European Search Report, European Patent Application No. 18858923.8, dated Apr. 22, 2021, pp. 1-10.

Jakobsson et al., "Could You Fall For A Scam?", IEEE Spectrum, IEEE Inc., vol. 53, No. 5, May 1, 2016, pp. 1-6.

Intellectual Property Office of Singapore, Written Opinion with Invitation, Singapore Patent Application No. 11202002350P, dated Jun. 25, 2021, pp. 1-7.

* cited by examiner

SYSTEM AND METHOD FOR INTEGRATING CYBER FRAUD INTELLIGENCE AND PAYMENT RISK DECISIONS

FIELD OF THE INVENTION

The invention relates generally to a system and method for identifying potentially fraudulent payment requests, and more particularly to a system and method that aggregates payment information and cyber fraud intelligence indicators to generate a risk score or other fraud determination.

BACKGROUND OF THE INVENTION

Various entities and corporations have observed an increase in fraudulent wholesale payment attempts as a result of social engineering, business email compromise (BEC), malware and network intrusions into US and foreign banks. In particular, reports of BEC scams have resulted in domestic and international losses in the billions. Between January 2015 and May 2016, an increase of $1,300% in losses was reported, totaling $3.1 billion.

In BEC scams, employees are tricked into initiating or authorizing wire transfers, providing financially sensitive and confidential information, or paying fake invoices. Attackers gain information from sources, such as social media, company websites, SEC filings to identify potential victims. Using victim profile content, attackers identify a victim's role and possibly their supervisor and then use this information to plan and launch the attack. BEC messages can range in sophistication and objectives, with some attempting to trick users into making fund transfers and others attempting to get the victim to provide information. Current systems focus on payment data from a requesting entity, e.g., an employee from a company. Accordingly, such systems are unable to accurately identify and address BEC scams and other socially engineered behavior.

These and other drawbacks currently exist.

SUMMARY OF THE INVENTION

According to one embodiment, the invention relates to a computer implemented system that combines payment data and cyber fraud indicators to identify potential fraud in payment requests from a client. The system comprises: a memory that stores and maintains a list of known fraud characteristics and cyber fraud indicators; and a computer processor, coupled to the memory, programmed to: receive, via an electronic input, a payment instruction from the client; identify one or more cyber fraud indicators associated with the payment instruction; apply payment decisioning to merge the one or more cyber fraud indicators to the payment instruction; generate a risk score based on the payment decisioning to determine whether the payment instruction should be executed; and automatically apply the payment decisioning to the payment instruction.

The system may include a specially programmed computer system comprising one or more computer processors, mobile devices, electronic storage devices, and networks.

The invention also relates to computer implemented method that combines payment data and cyber fraud indicators to identify potential fraud in payment requests from a client. The method comprises the steps of: storing and maintaining, in a memory, a list of known fraud characteristics and cyber fraud indicators; receiving, via an electronic input, a payment instruction from the client; identifying, via a programmed computer processor, one or more cyber fraud indicators associated with the payment instruction; applying, via the programmed computer processor, payment decisioning to merge the one or more cyber fraud indicators to the payment instruction; generating, via the programmed computer processor, a risk score based on the payment decisioning to determine whether the payment instruction should be executed; and automatically applying, via the programmed computer processor, the payment decisioning to the payment instruction.

The computer implemented system, method and medium described herein provide unique advantages to financial institutions, banking clients and other entities, according to various embodiments of the invention. Generally, wholesale payment risk decisions have been made based on information contained in payment instructions. This generally includes payment amount, currency, beneficiary, remitter, time, date, etc. This information is typically helpful when the party requesting the payment is the source of fraud. However, in instances where the payment requester is the target of fraud by a third party fraudster, the payment information alone will be insufficient to accurately detect fraud. An embodiment of the present invention is directed to merging payment instruction information with cyber fraud indicators to enhance payment risk decision process. Other advantages include banking client and customer loyalty and retention due to the improved satisfaction in addressing fraud. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
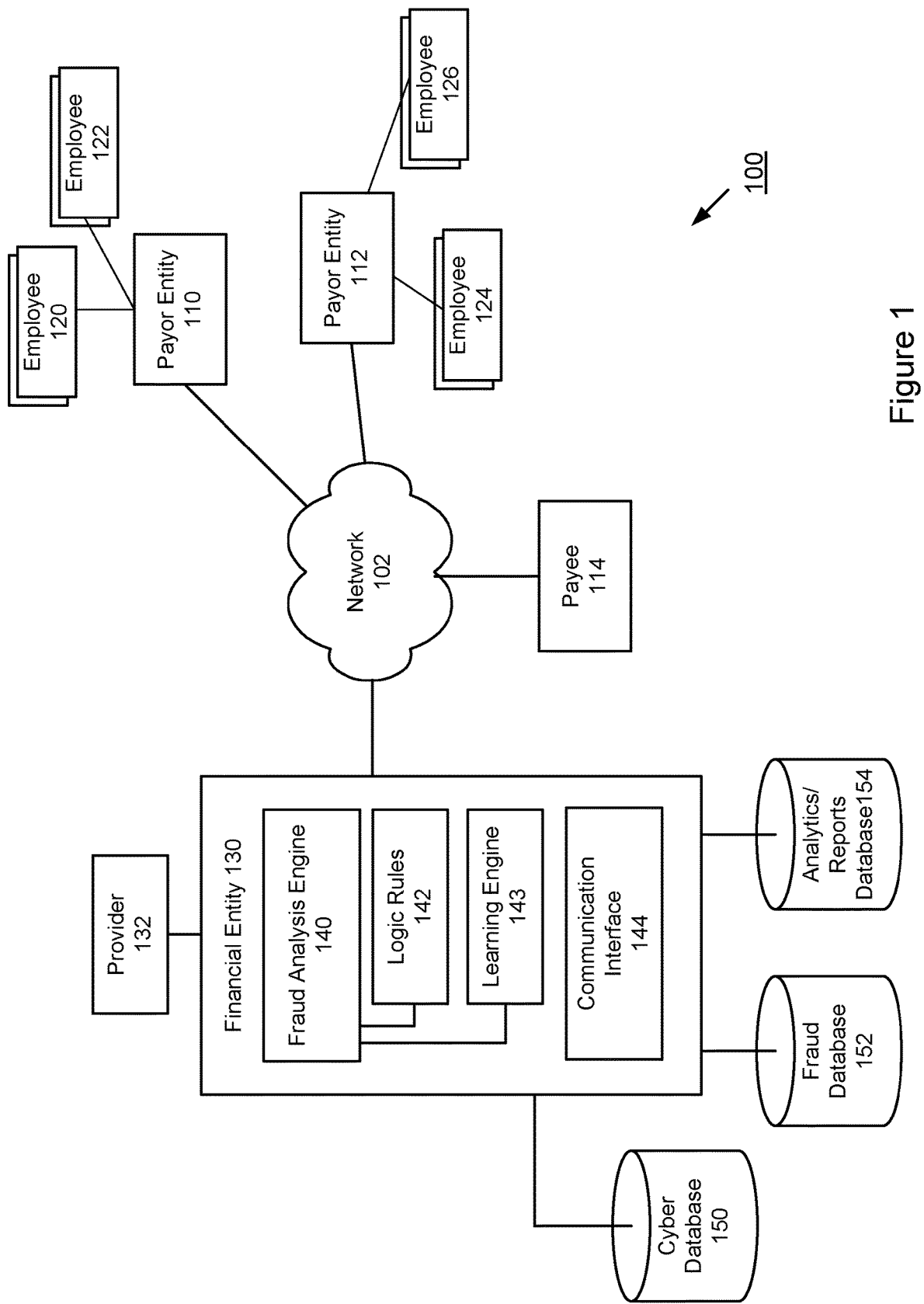
FIG. 1 illustrates a schematic diagram of a system that integrates cyber fraud intelligence in payment risk decisions, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

From a bank or financial institution's perspective, when a payment is initiated by an authorized representative of a client, all indicators will confirm that the request is proper. Accordingly, the bank will treat the payment instruction as legitimate and initiate a transfer of funds. An embodiment of the present invention addresses a fraud or attack on a client that occurs prior to the client initiating the request with the bank or financial institution. Because the fraud and malicious activity are taking place with the client (and not the bank or financial institution), the payment information will generally not contain any fraud indicators. For example, fraudsters may target the clients through social engineering and other tactics that will convince an employee or representative of the client to make a payment request that is then initiated by a financial institution. In this case, the client acts on improper information that a financial institution would not have any visibility into.

An embodiment of the present invention is directed to merging payment instruction information with cyber fraud indicators to enhance a payment risk decision process and identify high risk payments. For example, cyber fraud indicators may include IP addresses, autonomous system number (ASN), malware indicators, Automatic number identification (ANI), lookalike domains and/or other cyber related data. ASN may represent a unique number that is available globally to identify an autonomous system and which enables that system to exchange exterior routing information with other neighboring autonomous systems. ANI may represent a feature of a telecommunications network for automatically determining an origination telephone number. For example, ANI may represent a reference to a phone numbers from which a payment instruction is made as well as a modification to an existing instruction. The system may then assign a risk score to the transaction based on the presence of one or more of these indicators. As an example, a transaction originating from an ASN associated with a high risk that has not previously been visited by the device owner coupled with a phone inquiry received on the account from an ANI previously tied to fraud may receive a higher risk score than a transaction originating from the customer's home computer.

According to an embodiment of the present invention, the system may apply look-alike domain registrations as a fraud indicator relevant to business email compromise and other fraud behavior. Details are provided in patent application, U.S. Ser. No. 15/372,797, filed Dec. 8, 2016, the contents of which are incorporated by reference herein in its entirety. In accordance with an embodiment of the present invention, the domain name analysis may be used as part of risk-based decisioning. For example, by applying look-alike domain names as a fraud indicator, an entity may determine whether to release a transaction or proceed with a transaction and further determine whether the requesting domain name has been potentially compromised.

An embodiment of the present invention may be directed to applying cyber fraud indicators to generate a risk score or other indicator in risk based payment decisions. For example, a separate and distinct risk score for payments initiated by clients and destined for beneficiary accounts associated with other lines of business may incorporate features provided by Risk Based Authentication and Authorization Decisioning (RBAAD) and Common Customer Authentication (CCA) in Consumer and Community Bank (CCB) as well as the International Private Bank Online (IPB) which represents a banking portal for high net worth clients to move money via an online banking application. For example, RBAAD and CCA may make risk based authentication and payments decisions. This may be performed on demand which a banking portal for commercial and corporate clients to move money via an online banking application or other payments destined for Asset and Wealth Management (AWM), Commercial Bank (CB), and CCB beneficiary accounts). An embodiment of the present invention may identify account touches online, over the phone and via other forms of communication. The system may also apply device print patterns, etc. For example, if the CCB account scores above threshold, it may raise its risk score.

An embodiment of the present invention may include client side code detection. While there are a number of detection techniques available for identifying compromised customers using HTTP logs alone, there are inherent limitations to relying solely on HTTP traffic between the customer's system and the webserver. For example, a webinject may capture credentials by reading username, password, and (if applicable) token code as the victim types these values into the webpage. If these values are then sent to the fraudster's server, no abnormal web traffic may be visible in logs. Accordingly, increased visibility is needed. By implementing client-side code, an embodiment of the present invention may utilize many of the same detection techniques used in web server logs and further open up additional avenues for compromised customer detection. For example, client-side code may be implemented as JavaScript which may be linked and/or embedded into key pages (e.g., login page and landing page) as well as across multiple or every page within the platform.

An embodiment of the present invention is directed to correlating cyber events with payment events and further using the correlation across users of the same client and also using the correlation across different clients. For example, the correlation may be applied across the same, similar, affiliated, related and/or otherwise associated client. In an exemplary scenario, User 1 of client ABC may use a computer to make a payment where the computer may be associated with cyber events. An embodiment of the present invention may connect User 1 with User 2 of the same ABC company performing money movement of a certain size. In this example, User 2's money movement may be highlighted as an issue. User 2's request may be further analyzed for potential fraud. The system may also monitor User 2's request and confirm whether the payment request is fraudulent or not. If User 2's request is confirmed fraudulent, the system may identify the intended beneficiary as a fraudulent beneficiary that may then be applied to other payment requests for the same client as well as other clients. Client XYZ may be subject to the same (similar or related) fraudulent activity where the funds are destined for the same beneficiary identified in User 2's request. In this example, Client XYZ's activity may be stopped or flagged based on relevant information associated with User 1 of Client ABC.

An embodiment of the present invention is directed to connecting information elements together in a meaningful way across users and/or across clients; and further identifying risky transactions. The scoring feature may be based on a combination of binary rules, e.g., bad beneficiary that is known to be a problem, as well as other considerations. For example, the system may identify another user of the same client and further recognize that the money is going to a country that was never paid before. An embodiment of the present invention may further apply modeling and optimization. As successful detections of fraud occur, this data may then be used as training sets for supervised learning which, in an optimal scenario, may allow for an algorithm to correctly identify unseen instances of fraud that would not have been identified by binary rules.

An embodiment of the present invention is directed to risk based authentication as well as risk based payment decisioning. The innovative system may aggregate data elements to determine a risk score or profile. For example, if the risk score exceeds a certain numerical threshold, an embodiment of the present invention may identify clients that exceed a risk level and therefore identify the client as one to let go. Accordingly, the system may identify and apply precautions and verification measures prior to initiating a payment and/or other action.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

FIG. 1 illustrates a schematic diagram of a system that integrates cyber fraud intelligence in payment risk decisions, according to an exemplary embodiment. As illustrated, Network 102 may be communicatively coupled with various payor entities, represented by 110 and 112. For example, Payor Entity 110 may represent a financial institution client that is a corporation, small business and/or an entity that makes payments and/or receives payments. Payor Entity 110 may represent a company with employees, represented by 120, 122. Additional payor entities may be represented by 112 with various employees 124, 126. Payee Entity 114 may represent an recipient or beneficiary of a payment initiated by Payor Entity 110. Payee Entity may be a customer or client of Financial Entity 130. Payee Entity may also be associated with another financial institution, bank, entity, etc.

An embodiment of the present invention may recognize that clients of a financial institution may be targets of various fraud attacks, including BEC and other types of fraud. As shown, Payor Entity 110 may represent a company that employs various employees, represented by 120, 122. Other entities may be associated with Payor Entity 110, which may include contractors, subsidiaries, associations, etc. In the example of a BEC fraud, Payor Entity 110 (or an employee of Payor Entity or other authorized entity) may receive a fraudulent communication that tricks the payor entity into make a transaction, payment and/or other type of action, communication, sharing of information, access to information, payment, etc. Because the payment is an authorized payment, conventional fraud systems will not be alerted. An embodiment of the present invention applies apply cyber fraud intelligence indicators to determine payment risk for situations that involve a seemingly authorized transaction.

Network 102 may communicate with various entities, represented by 110, 112, 114. In addition, Network 102 communicates with Financial Entity 130 that provides various payment related services and/or other features.

Financial Entity 130 may include a Fraud Analysis Engine 140 that implements Logic Rules 142 to identify fraudulent and potentially fraudulent scenarios and actions. Fraud Analysis Engine 140 may apply cyber fraud intelligence to identify payment risks, according to an exemplary embodiment of the present invention. According to another embodiment, Fraud Analysis Engine 140 may receive data and inputs from various sources, including external sources. For example, external sources may include other financial institutions, clients, entities with corresponding or similar fraud data.

Fraud Analysis Engine 140 may also include Learning Engine 143. For example, an embodiment of the present invention may be directed to applying a learning algorithm to a user's behavior with respect to a client. The user's behavior (based on the learning algorithm) may be applied to another user of the same client. For example, the user of client ABC may be infected with a malware and thereby exhibit certain markers or indicators. Also, the user may be associated with an IP address that has been used by a known fraudster or had some involvement in a prior fraud event. In addition, the IP address may associated or connected by a common or related indicator that has been used or associated with one or more known fraudsters, e.g., common household, same geographic location.

Cyber Database 150 may store and maintain cyber data from clients, past fraud events, and/or other various sources of cyber related data. For example, Cyber Database 150 may include IP address, geolocation, device data, etc. Cyber Database 150 may also maintain client data, including client behavior, trends, known good behavior, known good indicators, good beneficiaries, etc. Fraud Database 152 may store and maintain fraud characteristics and data from known fraud events, for example. Fraud Database 152 may store data relating to fraud event, target (e.g., person/group/team targeted), amount (e.g., currency, threshold amounts, etc.), type of fraud request (e.g., wire transfer), type of target (e.g., communication channel, email, etc.) and/or other characteristic or factor. Fraud Database 152 may also identify known bad and known good fraud indicators, including bad/good beneficiaries, bad/good accounts, etc. Analytics/Reports Database 154 may store and maintain analytics, reports, trends and/or other data, etc. The payment risk analysis and processing described herein may be provided by Financial Entity 130 and/or a third party provider, represented by 132, where Provider 132 may operate with Financial Entity 130, for example.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Network 102 may be a wireless network, a wired network or any combination of wireless network and wired network.

For example, Network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although Network 102 is depicted as one network for simplicity, it should be appreciated that according to one or more embodiments, Network 102 may comprise a plurality of interconnected networks, such as, for example, a service provider network, the Internet, a cellular network, corporate networks, or even home networks, or any of the types of networks mentioned above.

Data may be transmitted and received via Network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Financial Entity 130 may communicate with various entities, via Communication Interface 144, using any mobile or computing device, such as a laptop computer, a personal digital assistant, a smartphone, a smartwatch, smart glasses, other wearables or other computing devices capable of sending or receiving network signals. Communication Interface 144 may represent a user interface and/or other interactive communication portal.

Financial Entity 130 may be communicatively coupled to Databases 150, 152, 154. Databases 150, 152, 154 may include any suitable data structure to maintain the information and allow access and retrieval of the information. For example, Databases 150, 152, 154 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases 150, 152, 154 may be any suitable storage device or devices. The storage may be local, remote, or a combination thereof with respect to Databases 150, 152, 154. Databases 150, 152, 154 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases 150, 152, 154 may have back-up capability built-in. Communications with Databases 150, 152, 154 may be over a network, or communications may involve a direct connection between Databases 150, 152, 154 and Financial Entity 130, as depicted in FIG. 1. Databases 150, 152, 154 may also represent cloud or other network based storage.

Figure 2:
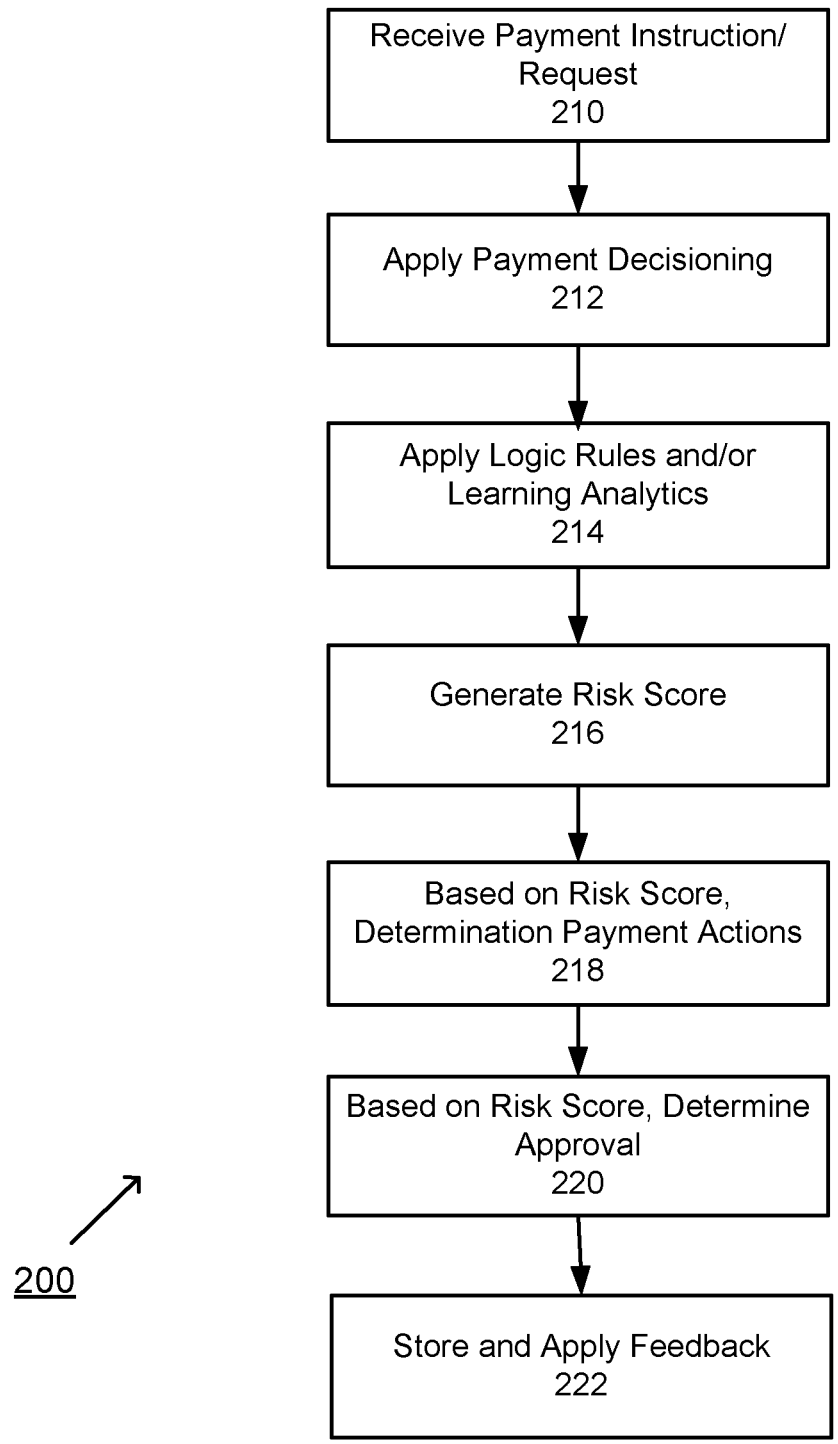
FIG. 2 is an exemplary flowchart that illustrates a method for identifying potentially fraudulent payment requests, according to an embodiment of the present invention.

FIG. 2 is an exemplary flowchart that illustrates a method for identifying potentially fraudulent payment requests, according to an embodiment of the present invention. At step 210, a payment instruction may be received. At step 212, payment decisioning that merges cyber fraud intelligence indicators with payment instruction data may be applied. At step 214, logic rules and/or learning analytics may be applied. At step 216, a risk score may be generated. At step 218, based on the risk score, one or more actions may be determined. At step 220, an approval for the payment instruction may be determined. At step 222, the system may store and apply feedback analysis for further refinement. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a payment instruction may be received. The payment instruction may be initiated by a payor entity or representative of a payor entity. The payment instruction may be received a payment processor, which may communicate with a Fraud Analysis Engine. According to another embodiment of the present invention, the payment instruction may represent a request for information or access to information. Other types of requests may be received.

At step 212, payment decisioning that merges cyber fraud intelligence indicators with payment instruction data may be applied. The Fraud Analysis Engine may apply payment decisioning that may include analyzing payment data with cyber fraud indicators, biometrics and/or other fraud indicators. For example, an embodiment of the present invention may implement voice biometrics for payments initiated over the phone. The system may leverage a library of known bad voice prints maintained by vendor(s) on behalf of other lines of business. Other sources of negative indicators may be applied.

As recognized by the various embodiments of the present invention, entities primarily in the commercial bank and corporate and investment banks space have been facing growing fraud trends. One of which is business email compromise (BEC) which has had significant impact on companies and financial institutions across the globe, resulting in losses of billions and billions of dollars. An embodiment of the present invention merges cyber intelligence indicators and/or data elements to perform risked based decisions to determine whether a payment is likely legitimate or not. An embodiment of the present invention considers cyber indicators, such as IP address, financial malware indicators, phone numbers associated with any of the instruction, etc. An embodiment of the present invention also applies look alike domain registrations that are highly indicative of business email compromise and other fraud behavior.

At step 214, logic rules and/or learning analytics may be applied. An embodiment of the present invention may recognize potentially fraudulent activity relating to one user (user 1 of client A) associated with a client and using the common client information, the system may identify another user (user 2 of client A). For example, an embodiment of the present invention may recognize another user of the same client is attempting to move money or perform another payment action. The system may then apply that learning from the other user into a current or other money movement activity. An embodiment of the present invention may obtain cyber indicators from user 1 of client ABC, and use those cyber indicators on user 2 of the same client ABC.

An embodiment of the present invention may recognize and apply characteristics and/or indicators associated with valid (as well as invalid) payments and behavior associated with an entity. For example, an embodiment of the present invention may recognize that a client has made and continues to make payments to a beneficiary for an extended duration. The system may recognize the beneficiary as a legitimate or good beneficiary. This intelligence may be applied to client ABC and other clients. Accordingly, an embodiment of the present invention applies cyber intelligence across multiple distinct clients. An embodiment of the present invention may also apply analysis to associated, affiliated and otherwise related entities. The system may further recognize common contacts, e.g., same contractor at both clients.

An embodiment of the present invention may identify known bad beneficiaries as well as identify bad beneficiaries for later confirmation. For example, the system may identify a fraudster that has committed fraud events (or been suspected of fraud). The system may also identify new bad actors to be captured in a model or analysis. Accordingly, the system protects clients from a known bad actor, that may be identified from various related or unrelated channels. This information may be used in the risk scoring or other fraud analysis.

For example, a bad actor may be identified from a previous transactions that may or may not have been fraudulent. For clients who identified the party as part of a fraudulent transaction, the system may then apply the party's name or identifier (or a set of characteristics associated with the party) to trigger a next potentially fraudulent transaction involving the identified party.

An embodiment of the present invention may consider beneficiary information, including whether the beneficiary is considered a bad or negative beneficiary. For example, bad beneficiary information may be collected across an industry and shared with information sharing peer groups. For example, information may be shared for mutual benefit across various industries with peers because such fraudsters often target multiple financial institutions. An embodiment of the present invention may also take bad beneficiary accounts that are derived or are identified on a retail side of the bank and further leverage those in a corporate investment bank space because fraudsters often target different types of fraud or different level or scales of fraud.

At step 216, a risk score may be generated. An embodiment of the present invention makes risk based decisions based on payment instructions and integrates additional data elements into that decision to make more accurate and informed risk based decisions. While the more data elements factored into a risk score, the more accurate the risk score, efficiencies may not allow for all available data to be considered. An embodiment of the present invention may determine an optimal number and quality of indicators to be applied in determining a risk score for a particular payment request or type of payment request. An embodiment of the present invention may also determine how many indicators and/or what type of indicators are optimal to make a confident risk based decisions. The number and quality of indicators may be based on an initial threshold inquiry regarding the payment request, entity requesting, geographic location, etc. According to another embodiment of the present invention, the decisioning may be applied to all transaction requests. In addition, the decisioning may be applied to transaction requests within a predetermined time period, within a geographic location, etc. Other variations may be applied.

An embodiment of the present invention may leverage various types of cyber indicators in making a payment decision and/or rendering a payment risk determination. For example, an embodiment of the present invention may merge cyber fraud intelligence indicators, such as IP address that a payment instruction is initiating from. The system may also observe whether the client is exhibiting a signature that is indicative of an infection of financial malware. For example, there may be an effort to mask or impersonate banking credentials. By combining various cyber intelligence indicators, an embodiment of the present invention may aggregate various cyber intelligence indictors to generate a risk score.

Moreover, based on certain considerations regarding confidence in the indicators, different weights may be applied in generating (e.g., updating, increasing, decreasing) the risk score. For example, the system may identify an emerging trend based on a particular type of fraud indicator. This may involve a particular attack on transactions destined for a foreign city. As a result, a higher weight may be applied to determinations involving that fraud indicator, e.g., transactions involving the foreign city. Also, the system may apply a higher risk level to transactions above a certain threshold amount. This may be captured by applying a higher weight to a higher transaction amount. Other variations may be applied.

An embodiment of the present invention may further leverage a separate and distinct risk score generated based on beneficiary account data elements-country risk by geographic location, infrastructure maturity, attack rate, etc.

An embodiment of the present invention may also consider data relating to a cyber fraud kill chain in assessing the efficacy of the detection techniques. Cyber fraud kill chain provides insights into a state of a victim throughout the phases of an attack, e.g., pre-compromise activity, post compromise/pre-abuse activity and post abuse activity, e.g., monetization of the crime. Typically, a financial institution has limited visibility into the pre-compromise and post-compromise/pre-abuse phases and the intent of such a technique is to increase the visibility through enhanced detection of fraud. As such, by employing a "Shift Left" approach, the financial institution aims to detect fraudulent activity earlier in the phases of the Cyber fraud kill chain and assesses the efficacy of its control by "shifting" its detection of fraud in the "post-abuse" stage to earlier stages, thus reducing impact on fraud losses.

Cyber fraud kill chain also provides a unified view of cyber and payment controls, e.g., initial phases of an attack may be cyber in nature while the abuse is financial) and increases a financial institution's visibility in the early stages of a cyber fraud attack.

Cyber fraud kill chain may involve several stages, including external reconnaissance (e.g., target research and collection of information on selected targets), delivery (e.g., transmission of payload to selected targets), exploitation (e.g., execution of the delivered payload through system vulnerability, social engineering, etc.), positioning (e.g., attacker positioning themselves to complete their goals while limiting exposure), abuse (e.g., attacker takes initial action toward realization) and monetization (e.g., attacker completes goal). An embodiment of the present invention may consider data from various stages in making a risk determination and further identifying a potential fraud attack. This additional insight allows an entity to identify attackers earlier in the process thereby reducing the impact of such attacks. For example, the system may recognize that a certain target is the focus of outside research where data requests are received from various requesters. The system may also recognize the type of information and level of detail available to the public via various sources, including social medial profile, professional websites, etc. Such information may be contribute to a fraudster's decision to pursue a particular target.

At step 218, based on the risk score, one or more actions may be determined. The system may identify actions that are permitted based on the risk score. For example, if the risk is determined to be low, the transaction may proceed. If there is some risk involved, the system may allow the transaction to proceed with a monitoring feature on the funds. At step 220, an approval for the payment instruction may be determined.

At step 222, the system may store and apply feedback analysis for further refinement. The system may continue to refine the process by examining and analyzing known fraud as well as known good transactions. The feedback analysis may also focus on client behavior information so that the system may better understand and predict a client's payment and transaction behavior. According to another example, a financial institution may recognize that a certain payment or other action may seem to diverge from a customer's pattern of behavior.

Figure 3:
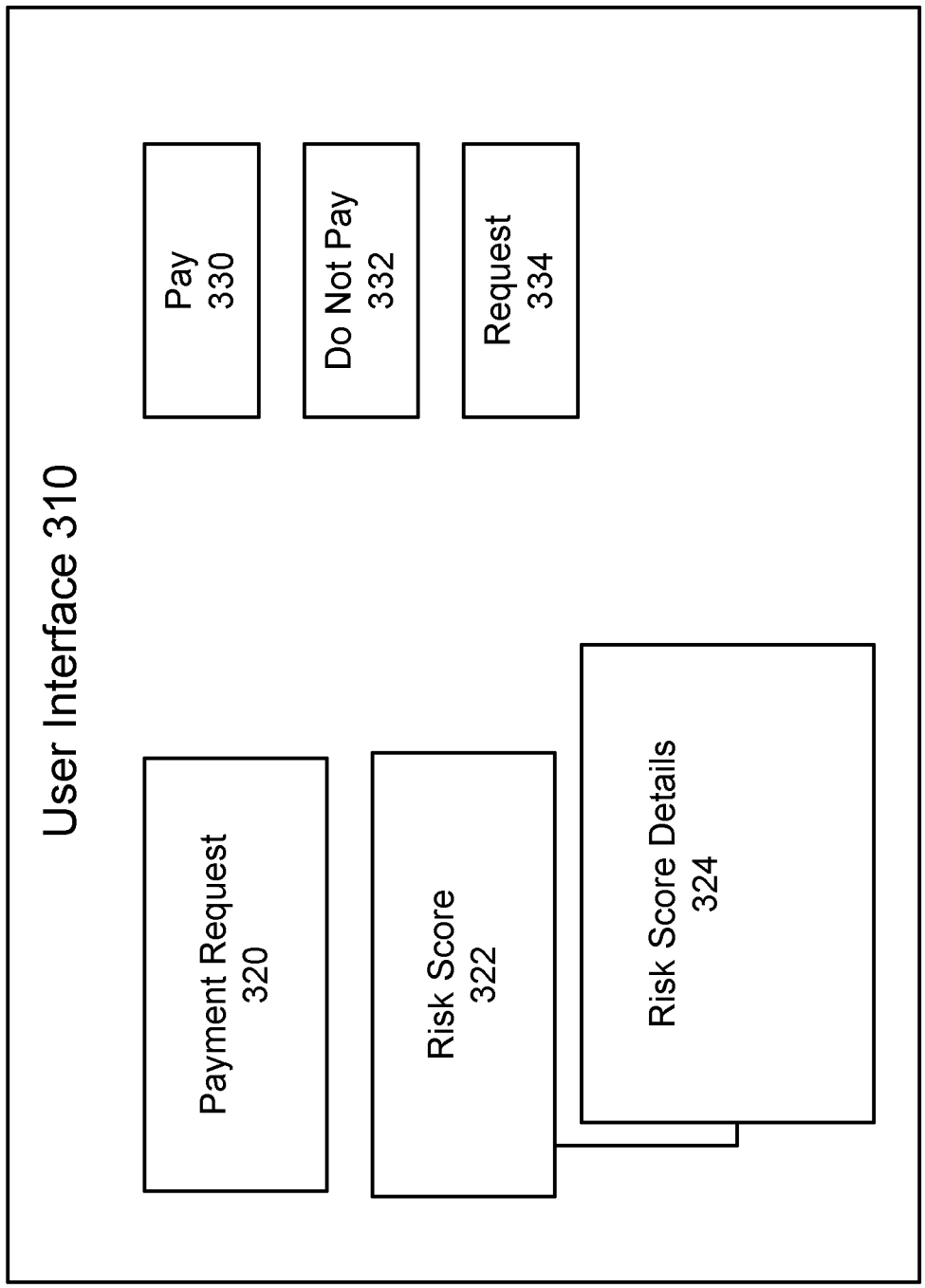
FIG. 3 represents an exemplary user interface that supports self-service functionality, according to an embodiment of the present invention.

FIG. 3 represents an exemplary user interface that supports self-service functionality, according to an embodiment of the present invention. An embodiment of the present invention may be directed to a user interface 310 that enables a self-service feature. In this embodiment, the client may make an ultimate decision based on a generated risk score as well as the underlying criteria for the risk score. For example, a client may initiate or submit a payment request 320. The payment request 320 may submit payment instructions received and/or initiated by another application or system. The client may review a risk score at 322 based on a combination of payment data analytics and cyber indicators. The client may also access risk score details that provide insight as to the underlying basis for the high or low risk score. The client may then determine a yes or no decision (e.g., pay 330 or not pay decision 332). The client may also request to view or access additional data. The client may also request additional analysis and/or other options, via Request 334. The system may support high value payments as well as low value ACH payments.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript, etc. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that combines payment data and cyber fraud indicators to identify potential fraud in payment requests from a client, the system comprising:
  a memory that stores and maintains a list of known fraud characteristics and cyber fraud indicators associated with activities prior to a payment instruction; and
  a computer processor, coupled to the memory, programmed to:
  receive, via an electronic input, a legitimate payment instruction from the client;
  identify a plurality of cyber fraud indicators, from one or more of a social engineering attack and a business email compromise attack against a client prior to the legitimate payment instruction that caused the client to initiate the legitimate payment instruction on fraudulent grounds, the social engineering attack and the email compromise attack based on leveraging information about the client acquired on a plurality of websites, and the plurality of cyber fraud indicators comprise an IP address associated with prior fraudulent activity, an autonomous system number associated with a high risk that has not been previously visited by a device used by the victim to initiate the payment instruction, a malware indicator originating from the victim's device indicating a risk of fraud, an automatic number identification that determines an origination telephone number associated with fraudulent activity, a look alike domain accessed by the device used by the victim prior to the payment instructions, and one or more voice biometrics,
  apply logic rules to determine look alike domain names by comparing one or more registered domain names to a list of known legitimate domain names;
  collect, to the extent not protected by a privacy shield, associated information relevant to each look alike domain name registration comprising a registration entity, and when the registration was made;
  determine if each look alike domain name registration is fraudulent, the determination depending at least in part on the associated information for each look alike domain name registration;
  apply the look alike domain registrations as one of the plurality of cyber fraud indicators relevant to the business email compromise attack against the client prior to the legitimate payment instruction, and by applying the look alike domain name as one of the plurality of cyber fraud indicators:
    determine whether to release a transaction or proceed with a transaction and
    determine whether a requesting domain name associated with the received legitimate payment instruction from the client has been potentially compromised;
  apply payment decisioning, based on learning analytics, to correlate the plurality of cyber fraud indicators to the legitimate payment instruction, whereby identified characteristics of potentially fraudulent activities are applied to downstream decisioning;
  apply learning analytics, based on known fraudulent activity and suspected fraudulent activity involving both a payor and a payment beneficiary, including fraud-based information from a plurality of payment instructions from one or more other clients, to the correlated plurality of cyber fraud indicators and legitimate payment instruction to determine that the legitimate payment instruction is likely originating from fraudulent activity, the determination made by the learning analytics is also based on a historical set of behavior for the client;
  generate a risk score based on the applied learning analytics to determine whether the legitimate payment instruction will result in an illegitimate payment, wherein the accuracy of the risk score is based on a number of indicators considered in the analysis and the number of indicators considered is determined based on the payment instruction, the client providing the payment instruction, and a geographic location for the payment instruction;

determine an action based on the risk score, the actions comprising one of completing a payment, denying a payment, and allowing a payment with continued monitoring of the payment;

add one or more new cyber fraud indicators identified in the received payment instruction to the list of known fraud characteristics and cyber fraud indicators; and perform feedback analysis via the learning analytics on known good transactions, known fraud, and the one or more new cyber fraud indicators to further train, refine, and improve the functioning of the learning analytics.

2. The system of claim 1, further comprising an interactive user interface that enables the client to view the risk score and determine a payment action in response.

3. The system of claim 1, wherein the computer processor is further programmed to: apply learning analytics from a first user of the client to a second user of the client.

4. The system of claim 1, wherein the computer processor is further programmed to: apply learning analytics from a first user of the client to a second user of a second client different from the client.

5. The system of claim 1, wherein the payment instruction further comprises a request for access to client sensitive information.

6. The system of claim 1, wherein the computer processor is further programmed to leverage a separate and distinct risk score generated based on beneficiary account data elements.

7. A method that combines payment data and cyber fraud indicators to identify potential fraud in payment requests from a client, the method comprising the steps of:

storing and maintaining, in a memory, a list of known fraud characteristics and cyber fraud indicators, associated with activities prior to a payment instruction;

receiving, via an electronic input, a legitimate payment instruction from the client;

identifying, via a programmed computer processor, plurality of cyber fraud indicators, from one or more of a social engineering attack and a business email compromise attack against a client prior to the legitimate payment instruction that caused the client to initiate the legitimate payment instruction on fraudulent grounds, the social engineering attack and the email compromise attack based on leveraging information about the client acquired on a plurality of websites, and the plurality of cyber fraud indicators comprise an IP address associated with prior fraudulent activity, an autonomous system number associated with a high risk that has not been previously visited by a device used by the victim to initiate the payment instruction, a malware indicator originating from the victim's device indicating a risk of fraud, an automatic number identification that determines an origination telephone number associated with fraudulent activity, a look alike domain accessed by the device used by the victim prior to the payment instruction, and one or more voice biometrics;

applying logic rules to determine look alike domain names by comparing one or more registered domain names to a list of known legitimate domain names;

collecting, to the extent not protected by a privacy shield, associated information relevant to each look alike domain name registration comprising a registration entity, and when the registration was made;

determining if each look alike domain name registration is fraudulent, the determination depending at least in part on the associated information for each look alike domain name registration;

applying the look alike domain registrations as one of the plurality of cyber fraud indicators relevant to the business email compromise attack against the client prior to the legitimate payment instruction, and by applying the look alike domain name as one of the plurality of cyber fraud indicators:

determining whether to release a transaction or proceed with a transaction and determining whether a requesting domain name associated with the received legitimate payment instruction from the client has been potentially compromised;

applying, via the programmed computer processor, payment decisioning, based on learning analytics, to correlate the plurality of cyber fraud indicators to the legitimate payment instruction, whereby identified characteristics of potentially fraudulent activities are applied to downstream decisioning;

applying learning analytics, based on known fraudulent activity and suspected fraudulent activity involving both a payor and a payment beneficiary, including fraud-based information from a plurality of payment instructions from one or more other clients, to the correlated plurality of cyber fraud indicators and legitimate payment instruction to determine that the legitimate payment instruction is likely originating from fraudulent activity, the determination made by the learning analytics is also based on a historical set of behavior for the client;

generating, via the programmed computer processor, a risk score based on the applied learning analytics to determine whether the legitimate payment instruction will result in an illegitimate payment, wherein the accuracy of the risk score is based on a number of indicators considered in the analysis and the number of indicators considered is determined based on the payment instruction, the client providing the payment instruction, and a geographic location for the payment instruction;

determining an action based on the risk score, the actions comprising one of completing a payment, denying a payment, and allowing a payment with continued monitoring of the payment;

adding one or more new cyber fraud indicators identified in the received payment instruction to the list of known fraud characteristics and cyber fraud indicators; and performing feedback analysis via the learning analytics on known good transactions, known fraud, and the one or more new cyber fraud indicators to further train, refine, and improve the functioning of the learning analytics.

8. The method of claim 7, further comprising the step of:
enabling, via an interactive user interface, the client to view the risk score and determine a payment action in response.

9. The method of claim 7, further comprising the step of:
applying learning analytics from a first user of the client to a second user of the client.

10. The method of claim 7, further comprising the step of:
applying learning analytics from a first user of the client to a second user of a second client different from the client.

11. The method of claim 7, wherein the payment instruction further comprises a request for access to client sensitive information.

12. The method of claim 7, further comprising the step of:
leveraging a separate and distinct risk score generated based on beneficiary account data elements.

* * * * *